S. CHAMBERS.
STUMP PULLER.
APPLICATION FILED OCT. 15, 1907. RENEWED JULY 7, 1909.
932,444.
Patented Aug. 31, 1909.
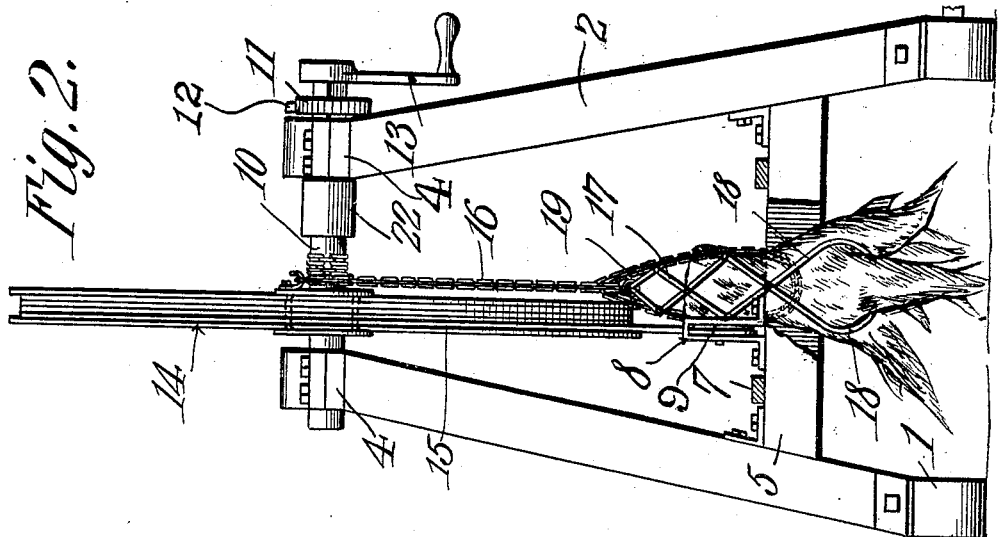
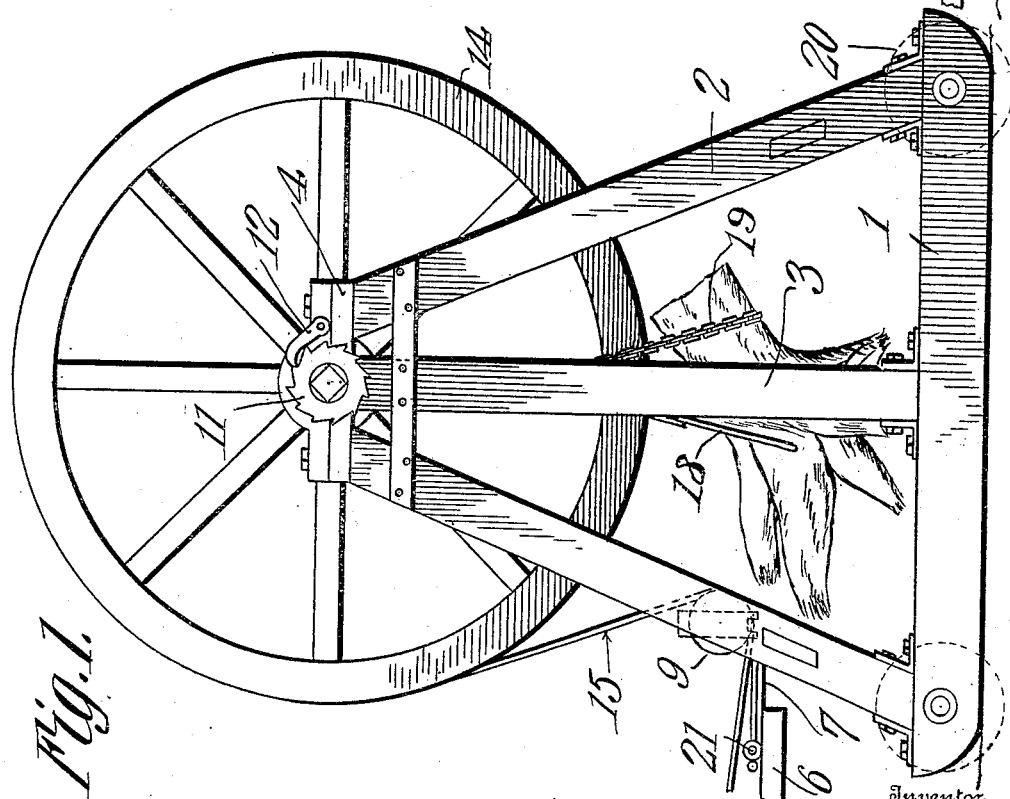
Witnesses
Inventor
Silas Chambers

UNITED STATES PATENT OFFICE.

SILAS CHAMBERS, OF TAHOKA, TEXAS.

STUMP-PULLER.

932,444.  Specification of Letters Patent.  Patented Aug. 31, 1909.

Application filed October 15, 1907, Serial No. 397,552. Renewed July 7, 1909. Serial No. 506,399.

*To all whom it may concern:*

Be it known that I, SILAS CHAMBERS, a citizen of the United States, residing at Tahoka, in the county of Lynn and State of Texas, have invented a new and useful Stump-Puller, of which the following is a specification.

This invention relates to stump pullers and its object is to provide a simple, durable and inexpensive device of this character which can be readily operated to pull stumps, the parts being so located as to prevent displacement of the apparatus during the pulling operation.

A still further object is to provide means whereby a stump can be firmly gripped and held, the grip being increased in proportion to the pull exerted upon the stump.

Another object is to provide simple and durable means for multiplying power utilized for pulling stumps.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a device embodying the present improvements, the supporting wheels therefor being shown in dotted lines. Fig. 2 is an end view.

Referring to the figures by characters of reference, 1—1 designate base strips or runners each of which is provided with upwardly converging standards 2 and an intermediate perpendicular standard 3 all of said standards being connected together at the top by a top strip 4. The standards 2 of the two runners 1 are connected by cross braces 5 and to one of these cross braces a tongue 6 may be secured by means of hounds 7. A bracket 8 is secured upon one of these cross braces and journaled therein is a sheave 9. A shaft 10 is journaled upon the top strip 4 and carries a ratchet wheel 11 which is normally engaged by a pawl 12. One end of this shaft is preferably angular so as to engage a crank 13 or other suitable power device whereby the shaft can be conveniently rotated manually. Secured to the shaft 10 and between the standards 2 and 3 of the two runners 1 is a grooved wheel 14 which is of sufficient diameter to enable the desired leverage to be obtained as will be hereinafter described. A cable 15 is secured at one end to this wheel and extends under the sheave 9 thence forward from the device. Secured to the wheel 14 close to shaft 10 is a chain 16 one end of which is connected to a lazy tongs 17 terminating in gripping arms 18. A looped chain 19 is also connected to the chain 16 and is suspended close to the lazy tongs.

In using the apparatus herein described the same is fed to the point of use preferably by mounting the runners on small wheels such as indicated at 20 by dotted lines in Fig. 1. The draft animal or animals are attached to the tongue 6 and a tree 21 and the device can therefore be readily transported. When the apparatus has reached the point of use the wheels 20 are removed and the gripping arms 18 placed in engagement with the stump. The draft animals are then attached to the cable 15 and driven forward. This will cause the cable to unwind from wheel 14 and the chain 16 will be caused to wind on shaft 10. The stump will therefore be drawn upward, the pressure of the arms 18 thereon increasing in proportion to the pull which is exerted. After the stump has been partly removed the same will swing into an inclined position whereupon loop 19 may be placed thereunder as shown in Fig. 1 so as to assist the arms 18 in raising the stump. The pawl 12 by engaging the ratchet 11 prevents the chain 16 from unwinding. After the stump has been pulled and detached from the arms 18 and loop 19 the chain 16 can be unwound and the cable 15 wound by rotating shaft 16 by means of the crank 13. As the shaft 10 is located directly above the stump it will be apparent that as the pull exerted upon the stump increases the framework is more firmly held in place and therefore there is no danger of the apparatus being pulled forward by the draft animals. It will of course be understood that the size of the wheel 14 can be varied to suit conditions, a larger wheel being desirable where big stumps are pulled whereas a smaller one can be employed for pulling smaller stumps. The apparatus is very simple, durable, and efficient, and can be readily placed in position and easily operated.

When small stumps are to be pulled a sleeve of any desired diameter and such as shown at 22 may be placed upon the shaft close to wheel 14 so that the chain can be more rapidly wound than in the manner heretofore set forth. Also, if a number of small stumps are located close together a plurality of grapples such as indicated at 18 may be connected to the chain 16 and all of the stumps pulled simultaneously. Guide spools or rollers may be located at any desired points upon the device for preventing displacement of the cable or chain 15.

What is claimed is:

1. In a stump puller the combination with a supporting frame; of a shaft journaled thereon, a stump engaging device, a flexible connection between said device and the shaft and disposed to be wound upon the shaft, a wheel secured to the shaft, and flexible means secured to and disposed to be unwound from the wheel to wind the connecting means on the engaging device.

2. In apparatus of the character described the combination with a supporting frame; of a shaft journaled thereon, a grooved wheel secured to the shaft, a flexible actuating device secured to and disposed to be unwound from said wheel, a stump gripping device, lazy tongs extending therefrom, and a flexible connection between said tongs and the shaft and disposed to be wound upon the shaft during the unwinding of the actuating device.

3. In a stump puller the combination with runners, standards thereon, and a shaft supported by the standards; of a gripping device, lazy tongs extending therefrom, a flexible device extending from said tongs and secured to and disposed to be wound upon the shaft, a wheel secured to the shaft, a flexible actuating device secured to the wheel and disposed to be unwound therefrom to wind the first mentioned flexible device upon the shaft, and means for holding the shaft against rotation in one direction.

4. The combination with runners, standards thereon, and a shaft journaled upon the standards; of a grooved wheel supported by the shaft, means for holding the shaft against rotation in one direction, a guide sheave supported between the standards, a flexible actuating device secured to and disposed to be wound upon the wheel, said device being guided by the sheave, a flexible device connected to the wheel and disposed to be wound upon the shaft during the unwinding of the first mentioned device, lazy tongs secured thereto, and gripping arms integral therewith.

5. In a stump puller the combination with lazy tongs, gripping arms integral therewith, and a loop coöperating with said arms; of a shaft, a flexible device connected to tongs and loop and disposed to be wound upon the shaft, and means for rotating the shaft.

In testimony that I claim the foregoing as my own, I have hereto affixed my signature in the presence of two witnesses.

SILAS CHAMBERS.

Witnesses:
S. N. McDaniel,
T. M. Bartley.